(No Model.)
F. A. HENNINGER.
FRAME FOR SPECTACLES OR EYEGLASSES.
No. 385,307. Patented June 26, 1888.
FIG. 1.
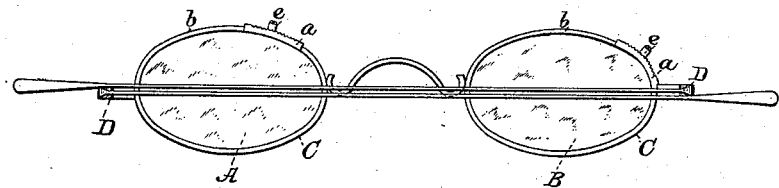
FIG. 2.          FIG. 3.
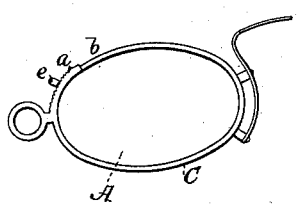 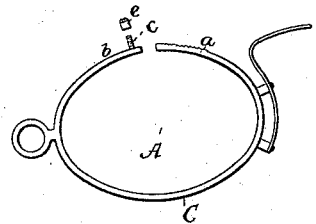
FIG. 4.          FIG. 6.
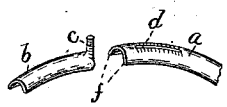 
FIG. 5.
Attest:
Geo. T. Smallwood.
Jas. K. McCathran.
Inventor,
Frederick A. Henninger,
by A. H. Smith & Son, Att'ys

UNITED STATES PATENT OFFICE.

FREDERICK A. HENNINGER, OF COLUMBIA, MISSOURI, ASSIGNOR OF ONE-HALF TO JOHN TH. FYFER, OF SAME PLACE.

FRAME FOR SPECTACLES OR EYEGLASSES.

SPECIFICATION forming part of Letters Patent No. 385,307, dated June 26, 1888.

Application filed April 6, 1888. Serial No. 269,860. (No model.)

*To all whom it may concern:*

Be it known that I, FREDERICK A. HENNINGER, of Columbia, county of Boone, and State of Missouri, have invented a new and useful Improvement in Frames for Spectacles or Eyeglasses, of which the following is a full, clear, and exact description, reference being had to the accompanying drawings, making part of this specification.

My invention relates to devices for more readily and perfectly securing the lenses in their frames or rims.

The object of the invention is to provide a simple and cheap means for properly securing different sizes of glasses in their rims or frames, so that they shall fit perfectly without the usual laborious and tedious process of grinding.

The invention consists of certain details of construction, fully described in the specification, and clearly pointed out in the claims.

Referring to the accompanying drawings, which illustrate my invention, Figure 1 is an elevation showing the application of my invention to both rims or lens-frames of a pair of spectacles. Fig. 2 is an elevation showing my invention applied to one lens-frame or rim of a pair of eyeglasses. Fig. 3 shows the frame or rim for an eyeglass with the clamping parts separated. Fig. 4 shows the clamping-pieces separated from the frame and adapted to be brazed or soldered upon the contiguous ends of a frame open at one point only. Fig. 5 is a view of the small nut used for holding the pieces of the frame in clamped or closed position, and Fig. 6 shows a modification in the manner of applying the nut and clamping-screw.

Similar letters refer to similar parts throughout the several views.

A B are the lenses of a pair of spectacles or eyeglasses.

C is a frame or rim which embraces and holds the usual lens.

D denotes the usual split side piece to which the temple is hinged.

$a$ denotes the slotted end of the frame.

$b$ is the opposite end of the frame, which is a little smaller than $a$, and slides in a concavity formed by the bent-down edges $ff$ of the slotted piece $a$.

$d$ is the slot through which the screw end $c$ of the opposite part, $b$, is inserted.

$e$ is the nut for screwing upon the part $c$.

$g$ is a slot or nick in the top of the nut.

It is well known that almost all glasses require much grinding before they will fit the usual frame and be so perfectly embraced by it that there are no open spaces between said rim or frame and lens.

The ordinary lens-frame is made open at the hinge-joint to which the temple is attached, and this allows a slight opening of the frame only, for the purpose of crowding in a large glass. In this case, however, the small open space left between these two parts of the frame to which the temple is hinged is unsightly and catches dirt. Further than this, the adjustment permitted in this way is very slight.

The purpose of my invention is to avoid the above-mentioned difficulty and to perfectly retain in the same frame lenses varying considerably in size, thus avoiding the tedious process of grinding the lens to fit the frame.

The device which I have invented for accomplishing my purpose may be applied alike to spectacles or eyeglasses, either with or without the usual meeting ends of the frame to which the temple is jointed. My invention, however, renders these meeting ends of the frame for the joint entirely unnecessary, as the frames need only open in a single place—namely, the one at which my clamping device is attached, and which may be at any desired part of the rim.

At the severed ends of the rim I make, as it were, a sort of clamp-joint. Upon one side I form a rectangular slot of considerable length, and roughen or barb the surface on both sides of said slot, in order that the nut $e$, which goes over the screw $c$, may hold more firmly when screwed snugly on. The sides of the frame for quite a distance from the end I bend inward, as at $ff$, so that they may embrace and firmly hold the opposite or tenon end of the frame, which is made small enough to slide therein.

Just at the end of the tenon or small piece $b$, I either make a perforation into which I insert a screw-post, $c$, or I turn up the end of $b$ itself and cut a screw-thread thereon. In the former case I insert the post through the slot

*d* after the part *b* is in place in the opposite part. In the latter case, where the post is an integral part of *b*, I fit the parts so that the tenon part may be sprung in between the portions *f f* and the post *c* into the slot *d*. These two clamping portions, as above described, may be integral with the rim or frame C, or they may be made separately, as seen in Fig. 4, and soldered to the separate ends of the frame, dispensing in all cases with the usual double pieces where the temple is hinged. This latter piece may be made single, and so made it gives great strength and permanence to the entire frame. The ends of the frame to form the clamping device may be stamped or otherwise formed into the required shape.

In operating my device I first loosen the screw-nut *e* with a small screw-driver fitted to straddle it and rest in the nick *g*. I now slide the part *b* outward until its post *c* reaches the extreme end of slot *d*. The lens is now inserted and the frame pressed closely around it and held there tightly. The nut *e* is then screwed solidly down upon the roughened upper surface of the frame, thus retaining the lens firmly and holding every part of the frame close to its edge.

I am aware that devices for telescoping the sides of the frame have been used about the usual meeting end of the frame where the temple is joined. I wish to avoid the use of this usual double piece and to give a much greater adjustment than can thus be given, and without disfiguring the frame. With my device an adjustment of half an inch, if required, can be readily made. This device may be applied to steel, rubber, gold, or silver frames of glasses, and it also may be used for retaining large single lenses, called "reading-glasses," in their frames.

Fig. 6 shows the screw-post shouldered and made separate from the frame and passing through the slot into a threaded eye or perforation in the tenon end—an obvious modification of the construction described.

Having thus described my invention, what I claim as new, and desire to secure by Letters Patent, is—

1. In a spectacle or eyeglass, means for adjusting the frame to suit different sizes of glasses, consisting in a lengthened slot in one end of a severed frame and a tenon on the opposite end carrying a screw-post at right angles to the line of the rim, and a nut for said post to hold the ends of the frame firmly at different points, substantially as described.

2. The combination of the slotted portion *a* and tenon portion *b*, when made separate from and attached to the respective severed ends of a lens-rim, combined with the securing-nut and post, substantially as herein described.

3. The combination, with the slotted end *a* of a lens-frame, of the screw-threaded post formed integral with the part *b*, and the nut *c*, substantially as herein described.

In testimony whereof I have hereunto set my hand.

FREDERICK A. HENNINGER.

Witnesses:
W. W. GANT,
JNO. S. CLARKSON.